United States Patent [19]
Campbell

[11] 4,065,226
[45] Dec. 27, 1977

[54] WATER WELL MONITOR

[76] Inventor: Gordon M. Campbell, 17700 N. Highway 101, Willits, Calif. 95490

[21] Appl. No.: 746,295

[22] Filed: Dec. 1, 1976

[51] Int. Cl.² .................................. F04B 49/04
[52] U.S. Cl. ........................ 417/40; 73/321; 200/84 R
[58] Field of Search ............ 417/40, 41; 200/331, 200/84 R; 73/321

[56] References Cited
U.S. PATENT DOCUMENTS

| 1,036,408 | 8/1912 | Alfredson | 417/41 X |
|---|---|---|---|
| 1,112,111 | 9/1914 | Bowser et al. | 417/40 |
| 1,811,952 | 6/1931 | Merritt | 417/40 X |
| 2,752,461 | 6/1956 | Euler | 417/40 |
| 2,874,574 | 2/1959 | Patureau | 73/321 |
| 3,217,541 | 11/1965 | Williamson | 73/321 |

Primary Examiner—Daniel M. Yasich
Attorney, Agent, or Firm—Blair & Brown

[57] ABSTRACT

A means to monitor the depth of water in a well and to prevent a pump from operating if the water level falls to a predetermined level, consisting of float and weight means operating a depth indicator and cutoff switch.

5 Claims, 3 Drawing Figures

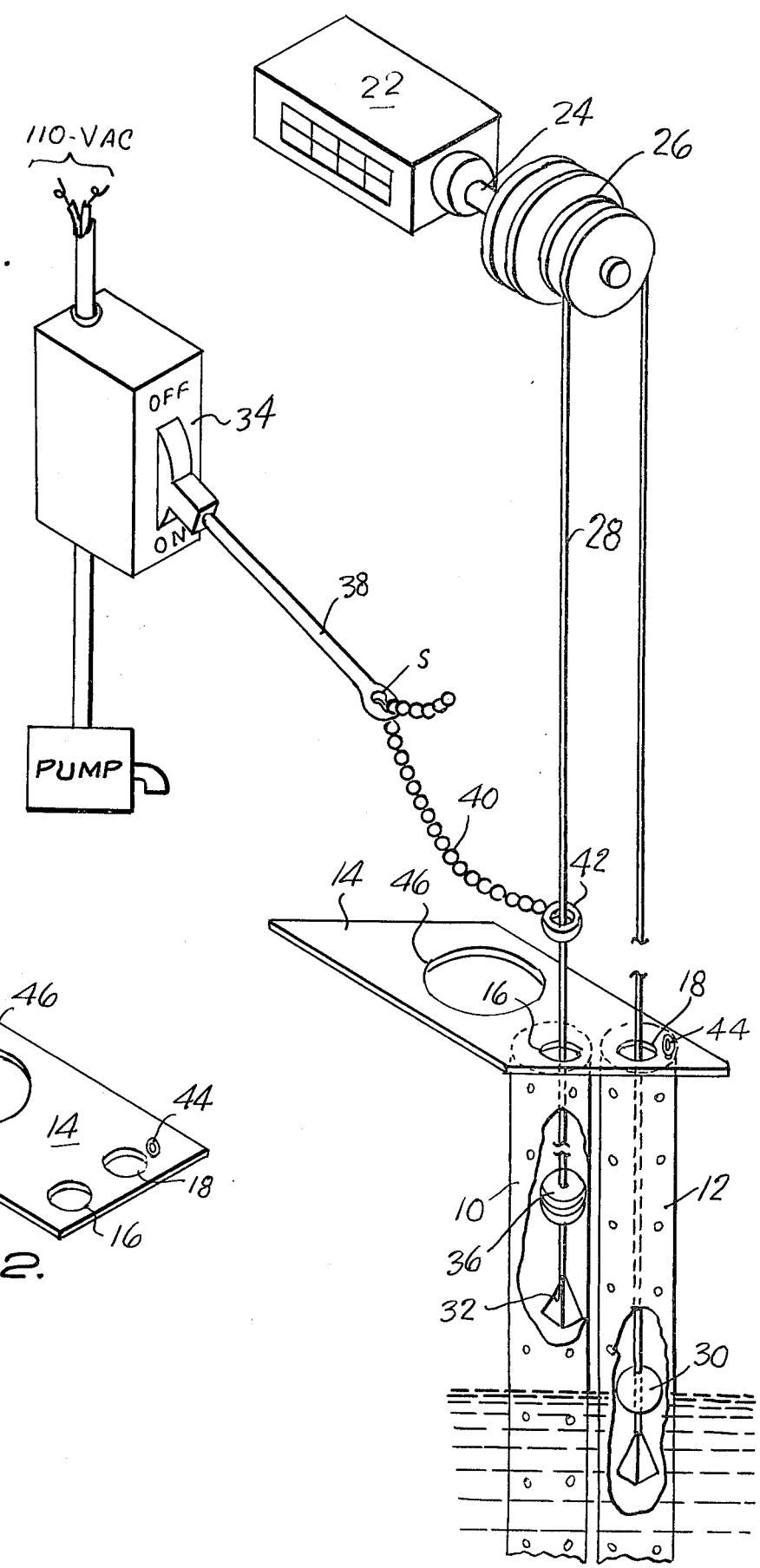

WATER WELL MONITOR

BACKGROUND OF THE INVENTION

Field of the Invention

For families living in rural areas and dependent on a well to supply water, it has been found that in times of drouth the water level may fall which limits the amount of water that should be used. Also the rate at which water in the well, after having been pumped down to fill a pressure supply tank refills the well should be watched to prevent over pumping. Also it is highly undesirable to permit the water level to fall to the point where air is taken into the pump, or where the pump is not submerged in water.

SUMMARY OF THE INVENTION

It is a primary object of this invention to provide a means by which the height of the water in the well may be indicated directly and read off easily.

It is a further object of the invention to provide means to shut off a motor driving a pump before the water level in the well falls below a safe level to protect the pump from burning out and/or pumping air, and means to return the motor to operative condition when the water level has risen sufficiently to resume pumping.

It is a further object of the invention to provide means so that after an initial measurement has been made of the depth of the well changes in the depth of the well may be measured.

Other objects and advantages will become apparent in the following specification when considered in light of the attached drawings.

BRIEF DESCRIPTION OF THE DRAWINGS

FIG. 1 is a diagrammatic perspective view partly broken away of the device in ordinary use;

FIG. 2 is a detailed perspective view of the well cover plate used; and

DESCRIPTION OF THE PREFERRED EMBODIMENT

Figure 3:
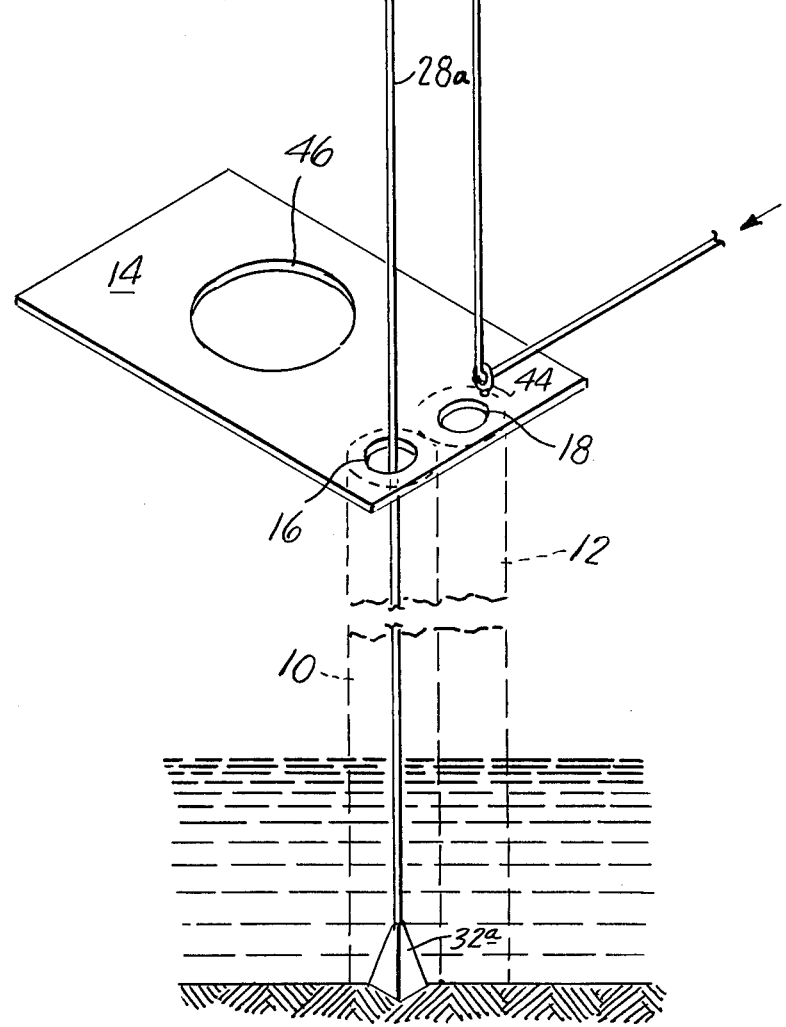
FIG. 3 is a diagrammatic perspective view of the device when used to determine changes in the depth of the well.

In FIG. 1 two guide tubes 10 and 12 are seen that are supported in the well by well cover 14 to extend down to a position below the pump intake which is at the foot of a well pipe extending down the well parallel to the guide tubes 10, 12. Guide tubes 10, 12 are preferably perforated to be sure of a free flow of water into them.

Cover plate 14, which may be of any suitable shape to perform its covering function is provided with two holes 16 and 18 and a hook or loop 20 adjacent hole 18. Hole 16 is centered on guide tube 10, and hole 18 is centered on guide tube 12.

A mechanical counting device 22 has a shaft 24 on which a double sheaved pulley 26 is keyed. Counting device 22 is positioned to be conveniently read and so that pulley 26 is positioned so that a strand of a drive-line 28 passing over one or other sheave of the double pulley 26 may be lead from hole 16 over pulley 26 and back to hole 18. It will be clear to any skilled artisan that the drive-line may be lead by idler guide pulleys if necessary instead of having holes 16 and 18 directly under pulley 26. Drive-line 28, however, does need to extend directly up from guide tube 10 sufficiently far to provide space for switch operating means, to be discussed below.

Within guide tube 12 a float 30 is attached to drive-line 28, and in guide tube 10 a counter weight 32 is secured to the other end of drive-line 28. Float 30 must be heavy enough to raise counter weight 32 as the water level falls in the guide tubes.

Drive-line 28 passes over one or other sheave of pulley 26. One sheave of pulley 26 is of a size to rotate the mechanism of counter 22 to give a numerical reading in feet of drive-line 28 passing over sheave 26; and the other sheave is of a size to rotate the mechanism of counter 22 to give a similar reading expressed in meters. While both sheaves are shown, it is clear that only one sheave of either size may be provided depending on whether a measurement in feet or in meters is desired.

As float 30 moves downwardly as water is pumped from the well, counter weight 32 moves upwardly as drive-line 28 moves up and over sheave 26. Movement of drive-line 28 rotates shaft 24 to operate counter 22, so that counter 22 will indicate, at any moment, the depth of the water in the well.

It will be known, for any well, the depth of water that is required to keep the pump intake submerged. It is desireable that the motor driving the pump be stopped before the water drops below that depth. A switch 34 is provided which, when in one position the motor may be operated, when in the other position the motor cannot be operated, this is not the switch that normally starts and stops the pump motor which is serviced through access 46, but is a safety switch.

A tripping disc 36 is mounted on drive-line 28 to move upwardly as float 30 moves downwardly. An arm or lever 38 normally holds switch 34 in the on position, on the end of lever 38 a flexible element 40 preferably a ball chain, is secured. A heavy ring 42 loosely surrounding drive-line 28 is secured to chain 40 on its end remote from lever 38. Ring 42 must be heavy enough so that, when ring 42 is not supported by the tripping disc 36, the lever 38 will be pulled down to keep the switch 34 in the "on" position, or, if the lever 38 has been moved to actuate the switch 34 to "off" position, the weight of ring 42 will, when tripping disc 36 is lowered as the water level rises, pull lever 38 to move the switch to the "on" position. Lever 38 incorporates an adjustment slot 5 for shortening or lengthening flexible element 40. This in turn increases or decreases the time relay for pump cut-in and accomodates differing pump and well capacities.

Tripping disc 36 is mounted on drive-line 28 at a position such that when float 30 has moved down to record a depth of water below which is would be undesirable to pump water out of the well, tripping disc 36 will have moved upwardly, first to contact and lift ring 42 so it no longer holds switch 34 in the "on" position, then to an elevation such that ring 42, acting through chain 40 will pull lever 38 upwardly to actuate switch 34 to the "off" position. It will then be impossible to operate the pump either manually or automatically until the tripping disc 36 is moved down past the position at which it first engaged and lifted ring 42. It will be seen therefore that there must be a considerable increase in the depth of water in the well between the time the tripping disc 36 stops the motor until the tripping disc, moving downwardly, releases ring 42 so its weight will move lever 38 to switch element 34 to the "on" position.

While it is probable that the motor referred to will be operated by electricity and that the switch will interupt the source of electricity to such a motor, switch 34 could be a switch in the electric ignition system of an internal combustion engine.

When the device is first installed it is desireable to measure the depth of the well. This is done by using the device as shown in FIG. 3. The counting device 22 with shaft 24 and sheave 26 is mounted as it will be in ordinary use, as also is well cover 14. Drive-line 28a, which may later of course, be the line 28 in FIG. 2, is placed over sheave 26 and weight 32a, which may be the same weight as will be later used in FIG. 2, as weight 32 is fastened to the add line 28a and lowered through hole 16. The counter 22 may be set at zero when the weight 32a is at well cover 14. As the weight is lowered, line 28a, which flows over sheave 26 from the loop or hook 44 will rotate shaft 24 so that counter 22 is actuated to indicate the distance in feet or in meters (according to the size of sheave 26) that weight 32a has descended down the well. When the weight 32a arrives at the solid bottom of the well it will no longer pull on line 28a. The lack of tension on line 28a is immediately sensed by the operator who is permitting line 28a to run fairly slowly through his hand. When the operator feels the weight 32a to have struck the bottom of the well, the number on counter 22 will indicate the depth of the well in feet, or in meters as the case may be. This number will be recorded so that at a later date when desired, the depth of the well may be measured in order to determine if a change in the depth of the well has occured. If a lesser depth is found at a second measurement, it is clear that sand or silt has accumulated which it may be necessary to remove.

Referring to FIG. 2, after the depth of the well has been measured in the first instance, float 30 may be fastened to driveline 28 to be just below well cover 14 with weight 32 on the other end of the line at the bottom of the well. Float 30 will move down the well lifting weight 32 until float 30 contacts the water. Reading the number on counter 22 will give the depth of water in the well and subtracting this number from the number representing the depth of the well will give the number of feet (or meters as the case may be) that the water level is below the well cover 14. At this time heavy ring 42 encircles line 28. Tripping disc 36 may then be positioned by the procedures indicated below and clamped on line 28 below ring 42.

It is known, of course, how far below well cover 14 the pump intake is located. Line 28 may then be pulled down on the side of sheave 26 that supports the float 30 until, by reading the number on counter 22, the weight 32 has been raised to the point it would be raised to if float 30 had been lowered, by the lowering of the water level to the point at which the switch 34 must be turned off to prevent operation of the pump to lower the water level further. While holding the weight 32 in this position ring 42 is then lifted along line 28 until it pulls lever 38 up and moves switch 34 to the "off" position. Holding ring 42 at this level, tripping disc 36 is clamped to line 28 to support ring 42. Weight 32 is then lowered until line 28 is held by weight 32 on one side, and float 30 floating on the water in the position for normal service. As weight 32 is lowered, ring 42 will pull switch 34 to the "on" position.

Having thus described the preferred embodiment of the invention it should be understood that numerous structural modifications and adaptations may be resorted to without departing from the spirit of the invention.

What is claimed is:

1. A well monitor comprising in combination a mechanical counter, a rotatable shaft actuating said counter, a sheave on said rotatable shaft, a drive-line passing over said sheave and having a first end of said drive-line depending from one side of said sheave to extend down the well, a float secured to the end of said first end adapted to float on the surface of the water in the well, a second end of said drive-line depending from the other side of said sheave to extend down into the well, a weight on said second end of said drive-line, said sheave having a circumference such that when a unit of lengths of said drive-line passes over said sheave, said counter indicates numerically the length of drive-line that has passed to indicate changes of the depth of water in the well, a cut-off safety switch for turning off a pump motor disposed in the well, and means to actuate said switch or deenergize said pump comprising a heavy ring loosely mounted about said second end of said drive-line, a length adjustable flexible means connected to said ring, a lever connected to said length adjustable flexible means at one extremity, and to said switch at the other, and a tripping disk clamped onto said second end of said drive-line below said heavy ring, said tripping disk serving to raise said heavy ring upwardly as the water level in the well falls, and to lower said heavy ring as the water level in the well rises.

2. The combination of claim 1 in which said sheave has two steps on it of different diameters, calbrated to provide readings in distinct measuring units.

3. The combination of claim 1 in which two perforated guide tubes extend downwardly into the well, the first end of said drive-line and the float being guided by one of said guide tubes, said second end of said drive-line and the weights being guided by the other said guide tube, whereby said end of said drive-line will be prevented from becoming entangled.

4. The combination of claim 1 including guide means to direct said drive-line over said sheave during well depth measurement.

5. A method of monitoring the amount of water in a well comprising determining the depth of the well by initializing a counter which will record the depth of the well by the amount of line passed over a sheave connected to said counter, said line having a weight disposed at one extremity and disposed within the well to traverse the well to its maximum depth, recording the depth, determining the amount of water in the well by initializing the counter and passing a line over a sheave connected to the counter having a float at its extremity, and disposing said line into said well to determine when the float touches the water level, comparing the last obtained number with the first obtained number to determine the amount of water in the well, determining the depth of a pump intake disposed within said well, and disposing a tripping disk on a line having a weight at one extremity approximate to said tripping disk which overlies said sheave and extends into the well at the other extremity having a float at its other extremity, so that the tripping disk will translate a support ring which is connected to a safety switch along said line to turn off said safety switch before the pump intake is above the water line.

* * * * *